Oct. 28, 1947. R. F. HELMKAMP 2,429,686
FLOATING PARALLELOGRAM CUTTING MACHINE
Filed Jan. 15, 1945
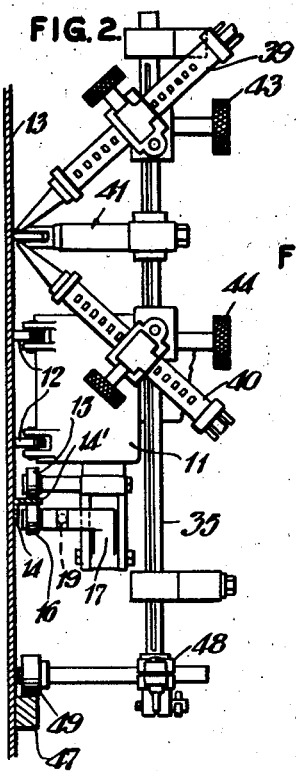
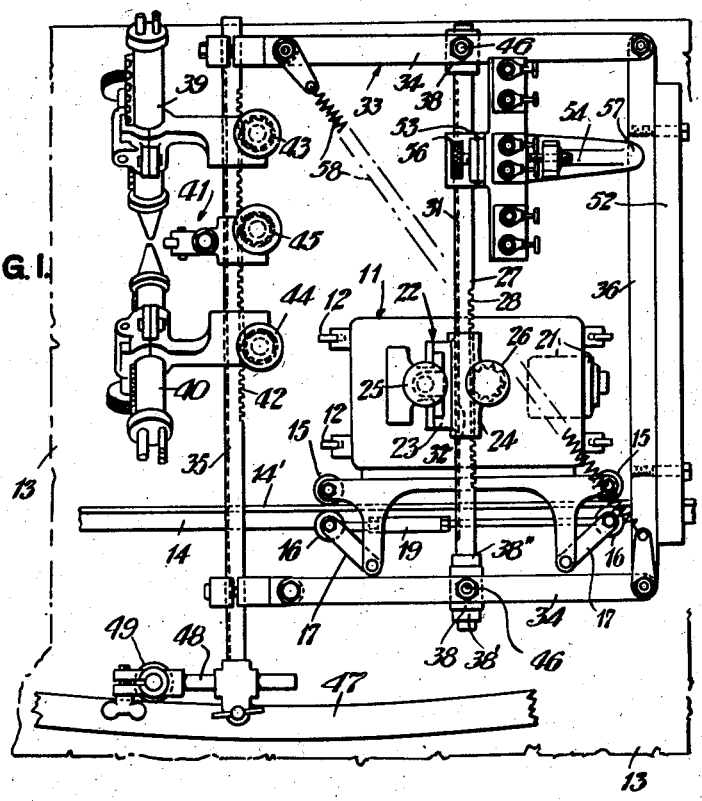
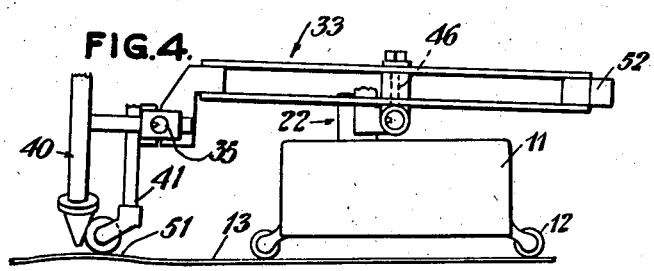
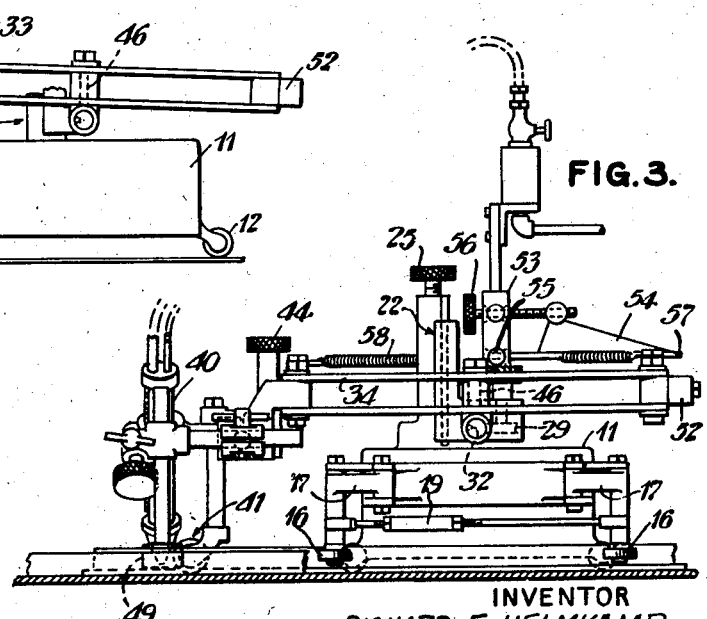
INVENTOR
RICHARD F. HELMKAMP
BY Pennie, Davis, Marvin & Edmonds
ATTORNEYS Patented Oct. 28, 1947

2,429,686

UNITED STATES PATENT OFFICE 2,429,686

FLOATING PARALLELOGRAM CUTTING MACHINE

Richard F. Helmkamp, Jersey City, N. J., assignor to Air Reduction Company, Incorporated, a corporation of New York Application January 15, 1945, Serial No. 572,862

12 Claims. (Cl. 266—23)

This invention relates to gas torch machines and more particularly to machines of the type adapted to travel on the work surface and its operable parts laterally adjusted by a guiding surface or template lying adjacent the side of the machine.

Prior gas torch machines of the pantograph type have been without means for gauging the torch from the work surface. The torch has been more or less fixed against vertical movement on the machine so that the spacing between the torch tip and the surface, at times when the machine is passing over an uneven surface, has not always been maintained.

It is the object of the present invention to provide in a pantograph type of gas torch machine an arrangement whereby the gas torch will follow the contour of the work surface.

It is another object of the invention to provide in such machines adequate adjusting facilities for initially locating the torch relative to a given work surface and adjustable stop means for limiting the downward movement of the torch.

According to the present invention, a horizontally-extending folding parallelogram linkage is connected to an adjustable mounting means on the machine carriage to pivot to and from the work surface. This linkage has at one end thereof a gas torch and a gauging device for supporting the torch and torch end of the linkage upon the work surface. At the opposite end of the linkage there is provided a counterweight for removing some of the weight from the torch end of the linkage. The unbalanced weight is supported on the gauge wheel. The linkage comprises longitudinally-extending arms and transverse members extending therebetween, one of the latter supporting the torches. The arms are respectively connected intermediate their length to a transverse shaft forming a part of the mounting means, for universal movement with respect thereto, i. e., for adjustment about a vertical axis and for adjustment about a horizontal axis. On the linkage is a device adapted to bear against a template to effect the lateral adjustment of the torch and linkage during the passage of the machine over the work surface. An adjustable stop means is provided on the machine for limiting the downward movement of the torch at times when the gauging device might encounter a hole or exaggerated depression in the work surface. The machine is particularly adapted for gas cutting operations as in the trimming of ship plate.

For other objects and for a better understanding of the invention, reference may be had to the following detailed description taken in connection with the accompanying drawing, in which:

Fig. 1 is a plan view of the machine supported upon a workpiece surface and its linkage being laterally gauged by a template lying adjacent thereto;

Fig. 2 is an end view of the machine as shown in Fig. 1;

Fig. 3 is a side elevational view of the machine and layout shown in Fig. 1;

Fig. 4 is a diagrammatic view in side elevation illustrating more clearly the principal feature of the invention.

Referring now to the figures, the carriage 11 having supporting wheels 12 is supported on a workpiece surface 13 and is adapted to be guided in its passage thereover by a guiding angle iron 14 fixed to the work surface. This guiding iron has a vertically-extending portion 14' which is engaged by roller elements 15 and 16 extending from the side of the carriage 11. The rollers 15 are rotatable about a fixed pivot whereas the rollers 16 are mounted on arms 17 to be adjusted toward and away from the iron vertically-extending portion 14'. There is a set of these rollers at each end of the machine and the arms 17 of each set are adjusted toward and away from the angle iron by a turnbuckle device 19 extending therebetween. The carriage 11 is driven over the work surface by a motor 21.

On the carriage 11 is a mounting means 22 including a vertically-extending slide 23 carrying a transversely-extending bearing support 24. An adjusting screw 25 serves to adjust the slide 23 vertically. An adjusting screw 26 on the bearing support serves to adjust a transverse supporting shaft 27 laterally with respect to the carriage. This shaft is adjusted through rack teeth 28 therein engaging with a gear 29 on the adjusting screw 26, Fig. 3. The shaft 27 has a longitudinally-extending key-way 31 adapted to contain a key 32 on the bearing support whereby rotation of the shaft in the bearing is prohibited at all times throughout the lateral displacement of the shaft. Shaft 27 forms a part of the mounting means and to the ends of the same there is connected a horizontally-extending folding parallelogram linkage 33.

This linkage includes parallel longitudinally-extending arms 34 and transversely-extending members 35 and 36 respectively pivotally connected between the ends of the arm members 34. Intermediate the length of the arm members and between their pivotal connections with the transverse members 35, 36 at the respective corners of the linkage are transversely-extending sleeves 38 adapted to fit over the ends of the transverse support shaft 27 for pivotal adjustment thereabout. By means of these sleeves the linkage can pivot and the transverse shaft 35 which carries gas torches 39, 40 and a gauging device 41 can float vertically. The transverse support 35 has rack teeth 42 adapted to be engaged by the adjusting screws 43, 44, 45 of the respective torches 39, 40 and of the gauging device 41 so that lateral adjustment of these elements across the support can be effected.

One of the sleeves 38 is retained against axial movement on the shaft 27 by collars 38' and 38" located respectively at each side of the sleeve. These collars will hold the linkage against transverse displacement on the shaft 27. There is no need to add collars to the shaft adjacent the sleeve 38 on the opposite end of the shaft 27 for this purpose.

Extending upwardly from each sleeve is a shaft 46 to provide a vertical axis on which respective arms 34 can pivot in order that the linkage can fold or be adjusted laterally for following a curved template 47. Transverse member 35 extends to one side of the arm 34 located at the left of the machine to carry an adjustable bracket 48 having a roller 49 adapted to abut the template 47 to be guided thereby. As the machine progresses over the work, the roller 49 will follow the template 47 and cause the torches 39, 40 to follow the template, the linkage being pivoted about the vertical shafts 46 on the sleeves 38. At the same time the linkage can float up and down on the gauging device 41, Fig. 4, to follow the wavy work surface as indicated at 51.

On the transverse support member 36 at the opposite side of the pivot from the torch transverse support 35 is a counterweight 52 adapted to relieve the gauging device 41 of some of the weight of the linkage. Only the unbalanced weight is supported on the gauging device.

Also supported on the shaft 27 is a bracket 53 for supporting certain of the gas piping utilized for the feeding of the gas to the torches 39, 40. On this same bracket 53 is an adjustable stop arm 54 adapted to be pivotally adjusted about a pivot point 55, Fig. 3, by an adjusting screw 56 extending through the bracket 53. The outer end 57 of the stop 54 engages the transverse member 36 at times when the gauge wheel drops into a hole or exaggerated depression in the work 13. This stop prevents the torches and gauging device from being destroyed on such occasions.

To keep the linkage from collapsing laterally, there is provided a tension spring 58 extending diagonally from one corner of the linkage to the opposite corner.

While various changes may be made in the detail construction, it shall be understood that such changes should be within the spirit and scope of the present invention as defined by the appended claims.

What is claimed is:

1. In a machine in which an instrument is guided over a work-piece in accordance with the movement of a tracer or template follower, a carriage, means for guiding the carriage along a predetermined course relative to the work-piece, a horizontal transverse shaft mounted on the carriage, a folding parallelogram linkage having arms pivotally mounted on the shaft so that each arm can swing in a horizontal plane and can also move in a vertical plane about the horizontal axis of said shaft, the folding parallelogram linkage also having an instrument-supporting member pivotally interconnecting the arms and extending transversely of the carriage, a work-performing instrument mounted on said instrument-supporting member with its end in spaced relation to the work surface, and means also carried by said instrument-supporting member and adapted to contact with the work surface for supporting the instrument-carrying end of the folding parallelogram linkage and moving it vertically about the axis of said shaft in response to irregularities in the work surface so that said end of the reproducing instrument will follow such irregularities.

2. In a machine in which an instrument is guided over a work-piece in accordance with the movement of a tracer or template follower, a carriage, means for guiding the carriage along a predetermined course relative to the work-piece, a horizontal transverse shaft mounted on the carriage, a folding parallelogram linkage having arms pivotally mounted on the shaft so that each arm can swing in a horizontal plane and can also move in a vertical plane about the horizontal axis of said shaft, the folding parallelogram linkage also having an instrument-supporting member pivotally interconnecting the arms and extending transversely of the carriage, a work-performing instrument mounted on said instrument-supporting member with its end in spaced relation to the work surface, means also carried by said instrument-supporting member and adapted to contact with the work surface for supporting the instrument-carrying end of the folding parallelogram linkage and moving it vertically about the axis of said shaft in response to irregularities in the work surface so that said end of the reproducing instrument will follow such irregularities, and means for adjusting said shaft longitudinally of itself and transversely of the carriage to shift the entire parallelogram linkage transversely.

3. In a machine in which an instrument is guided over a work-piece in accordance with the movement of a tracer or template follower, a carriage, means for guiding the carriage along a predetermined course relative to the work-piece, a horizontal transverse shaft mounted on the carriage, a pair of sleeves rotatably mounted on said shaft, a vertical pivot pin carried by each sleeve, a folding parallelogram linkage having arms pivotally mounted on said pivot pins so that each arm can swing in a horizontal plane, each of said sleeves permitting movement of the corresponding arm in a vertical plane about the horizontal axis of said shaft, the folding parallelogram linkage also having an instrument-supporting member pivotally interconnecting the arms and extending transversely of the carriage, a work-performing instrument mounted on said instrument-supporting member with its end in spaced relation to the work surface, and means also carried by said instrument-supporting member and adapted to contact with the work surface for supporting the instrument-carrying end of the folding parallelogram linkage and moving it vertically about the axis of said shaft in response to irregularities in the work surface so that said end of the reproducing instrument will follow such irregularities.

4. In a machine in which an instrument is guided over a work-piece in accordance with the movement of a template follower, a carriage, means for guiding the carriage along a predetermined course relative to the work-piece, a horizontal transverse shaft mounted on the carriage, a folding parallelogram linkage having arms pivotally mounted on the shaft so that each arm can swing in a horizontal plane and can also move in a vertical plane about the horizontal axis of said shaft, the folding parallelogram linkage also having an instrument-supporting member pivotally interconnecting the arms and extending transversely of the carriage, a work-performing instrument mounted on said instrument-supporting member with its end in spaced relation to the work surface, and a template follower carried by the folding parallelogram linkage and adapted to follow a template to effect lateral movement of the linkage and the work-performing instrument during movement of the carriage along its course.

5. In a machine in which an instrument is guided over a work-piece in accordance with the movement of a tracer or template follower, a carriage, means for guiding the carriage along a predetermined course relative to the work-piece, a horizontal transverse shaft mounted on the carriage, a folding parallelogram linkage having arms pivotally mounted on the shaft so that each arm can swing in a horizontal plane and can also move in a vertical plane about the horizontal axis of said shaft, the folding parallelogram linkage also having an instrument-supporting member pivotally interconnecting the arms and extending transversely of the carriage, a work-performing instrument mounted on said instrument-supporting member with its end in spaced relation to the work surface, and a gauge device connected to the folding parallelogram linkage for normally supporting its instrument-carrying end and moving it vertically about the axis of said shaft in response to irregularities in the work surface so that said end of the reproducing instrument will follow such irregularities.

6. In a machine in which an instrument is guided over a work-piece in accordance with the movement of a tracer or template follower, a carriage, means for guiding the carriage along a predetermined course relative to the work-piece, a horizontal transverse shaft mounted on the carriage, a folding parallelogram linkage having arms pivotally mounted on the shaft so that each arm can swing in a horizontal plane and can also move in a vertical plane about the horizontal axis of said shaft, the folding parallelogram linkage also having an instrument-supporting member pivotally interconnecting the arms and extending transversely of the carriage, a work-performing instrument mounted on said instrument-supporting member with its end in spaced relation to the work surface, a gauge device connected to the folding parallelogram linkage for normally supporting its instrument-carrying end and moving it vertically about the axis of said shaft in response to irregularities in the work surface so that said end of the reproducing instrument will follow such irregularities, and adjustable stop means for limiting the vertical movement of the work-performing instrument and the gauge device toward the work.

7. In a machine in which an instrument is guided over a work-piece in accordance with the movement of a tracer or template follower, a carriage, means for guiding the carriage along a predetermined course relative to the work-piece, a horizontal transverse shaft mounted on the carriage, a folding parallelogram linkage having arms pivotally mounted intermediate their ends so that each arm can swing in a horizontal plane and can also move in a vertical plane about the horizontal axis of such shaft, the folding parallelogram linkage also including a transversely-extending instrument-supporting member pivotally interconnecting the corresponding ends of the two arms and a transversely-extending member pivotally connecting the other ends of the two arms, a counterweight carried by said last-mentioned member, a work-performing instrument mounted on said instrument-supporting member with its end in spaced relation to the work surface, and means also carried by said instrument-supporting member and adapted to contact with the work surface for supporting the instrument-carrying end of the folding parallelogram linkage and moving it vertically about the axis of said shaft in response to irregularities in the work surface so that said end of the reproducing instrument will follow such irregularities.

8. In a gas torch machine in which the torch is guided over a work piece, a carriage, a folding parallelogram linkage including substantially parallel arms, means supporting the parallelogram linkage from the carriage, said supporting means including vertical pivots about which said arms are movable in a horizontal plane and horizontal pivots about which said arms are movable in a vertical plane, said parallelogram linkage also including a member pivotally interconnecting the arms at one side of said pivots, a gas torch supported from said member and means adapted to contact with the work surface for supporting the gas torch and the end of said linkage from which it is supported and to move the torch and said end of the linkage vertically about said horizontal pivots in response to irregularities in the work surface so that the torch will follow such irregularities.

9. In a gas torch machine in which the torch is guided over a work piece, a carriage, a folding parallelogram linkage including substantially parallel arms, means supporting the parallelogram linkage from the carriage, said supporting means including vertical pivots about which said arms are movable in a horizontal plane and horizontal pivots about which said arms are movable in a vertical plane, said parallelogram linkage also including a member pivotally interconnecting the arms at one side of said pivots, a gas torch supported from said member, means adapted to contact with the work surface for supporting the gas torch and the end of said linkage from which it is supported and to move the torch and said end of the linkage vertically about said horizontal pivots in response to irregularities in the work surface so that the torch will follow such irregularities, and adjustable stop means for limiting the vertical movement of the torch relative to the work.

10. In a gas torch machine in which the torch is guided over a work piece, a carriage, a folding parallelogram linkage including substantially parallel arms, means supporting the parallelogram linkage from the carriage, said supporting means including vertical pivots about which said arms are movable in a horizontal plane and horizontal pivots about which said arms are movable in a vertical plane, said parallelogram linkage also including a member pivotally interconnecting the arms at one side of said pivots, a gas torch supported from said member, a counterweight at the other side of said pivots effective to counterbalance a portion of the weight of the torch and the end of the parallelogram linkage to which it is attached, and means adapted to contact with the work surface for supporting the gas torch and the end of said linkage from which it is supported and to move the torch and said end of the linkage vertically about said horizontal pivots in response to irregularities in the work surface so that the torch will follow such irregularities.

11. In a gas torch machine in which the torch is guided over a work piece, a carriage, a generally horizontally-extending shaft mounted on the carriage, a folding parallelogram linkage including substantially parallel arms, means supporting the parallelogram linkage from said shaft, said supporting means including vertical pivots about which said arms are movable in a horizontal plane and horizontal pivots about which said arms are movable in a vertical plane, said parallelogram linkage also including a member pivotally interconnecting the arms at one side of said pivots, a gas torch supported from said member, and means adapted to contact with the work surface for supporting the gas torch and the end of said linkage from which it is supported and to move the torch and said end of the linkage vertically about said horizontal pivots in response to irregularities in the work surface so that the torch will follow such irregularities.

12. In a gas torch machine in which the torch and work piece move relatively during a cutting operation, a base, a folding parallelogram linkage including substantially parallel arms, means supporting the parallelogram linkage from the base, said supporting means including vertical pivots about which said arms are movable in a horizontal plane and horizontal pivots about which said arms are movable in a vertical plane, said parallelogram linkage also including a member pivotally interconnecting the arms at one side of said pivots, a gas torch supported from one end of said linkage, and means adapted to contact with the work surface for supporting the gas torch and the end of said linkage from which it is supported and to move the torch and said end of the linkage vertically about said horizontal pivots in response to irregularities in the work surface so that the torch will follow such irregularities.

RICHARD F. HELMKAMP.

REFERENCES CITED

The following references are of record in the file of this patent:

UNITED STATES PATENTS

| Number | Name | Date |
|---|---|---|
| 1,807,989 | Krebs | June 2, 1931 |
| 1,841,878 | Claude | Jan. 19, 1932 |
| 1,901,254 | Messer | Mar. 14, 1933 |
| 2,085,112 | McKiernan | June 29, 1937 |
| 2,263,036 | Anderson | Nov. 21, 1944 |
| 2,223,452 | Jones et al. | Dec. 3, 1940 |
| 1,172,933 | Bucknam | Feb. 22, 1916 |
| 1,542,887 | Irvin et al. | June 23, 1925 |

FOREIGN PATENTS

| Number | Country | Date |
|---|---|---|
| 474,033 | Great Britain | Oct. 21, 1937 |